Dec. 9, 1952 R. R. LAW 2,621,303

GRID STRUCTURE FOR ELECTRON TUBES

Filed July 30, 1948 2 SHEETS--SHEET 1

Inventor
RUSSELL R. LAW

By William A. Zalesak

Attorney

Dec. 9, 1952 R. R. LAW 2,621,303

GRID STRUCTURE FOR ELECTRON TUBES

Filed July 30, 1948 2 SHEETS—SHEET 2

Inventor

RUSSELL R. LAW

By William A. Zalesak

Attorney

Patented Dec. 9, 1952

2,621,303

UNITED STATES PATENT OFFICE 2,621,303

GRID STRUCTURE FOR ELECTRON TUBES

Russell R. Law, Princeton Township, Mercer County, N. J., assignor to Radio Corporation of America, a corporation of Delaware Application July 30, 1948, Serial No. 41,576

11 Claims. (Cl. 313—348)

In this application, I disclose improved grid electrodes and an improved method of and apparatus for fabricating metal grid electrodes. My method and apparatus is especially useful for making grid electrodes which comprise a support or supports, and a plurality of metal grid elements fastened thereto. The grid structures may be made of various metals appropriate for such use. In preferred embodiments, I used tungsten elements or wires and copper supports. Because of the unusual properties of tungsten, such a grid possesses a number of desirable properties. For example, a tungsten-wire grid is strong mechanically, it is a good heat and electrical conductor, and finally it is not damaged by overheating. The high thermal conductivity of the copper supports contribute to and enhance these desirable qualities.

Heretofore, tungsten elements have been fastened to other metals by spot welding. However welds to copper can be accomplished only with great difficulties. Moreover, it would be impractical to weld a large number of fine wires such as make up a grid electrode to the support member or members. Soldering in accordance with known practices would be impossible especially when the supports are good heat conductors since the supports would become so hot that all joints would run and while one element is being soldered to the support, other elements would become unsoldered.

An object of my invention is to provide a more practical method of fastening metal elements such as used in grids to the support or supports therefore and improved apparatus for carrying out said improved method. In a sense, it might be said that an object of my invention is to provide a metal bonding process to replace spot welding where use of the same is impractical. My invention, of course, goes much farther since it involves a practical method of and means for assembling grid electrodes and the like and fastening the grid elements to their support or supports. This object is attained in accordance with my invention by assembling the grid wire elements on the support or supports in a novel manner, restraining the grid elements as assembled in a novel manner, applying solder to all of the joints and heating the assembly until the solder runs to form the bonds.

A further object of my invention is to provide improved grid structures for use in electron discharge devices, which grid structure may be readily fabricated in accordance with my improved method.

A further object of my invention is to provide jigs for holding the grid supports, and grid elements in place as desired during the novel fabricating process described briefly above.

Figure 1:
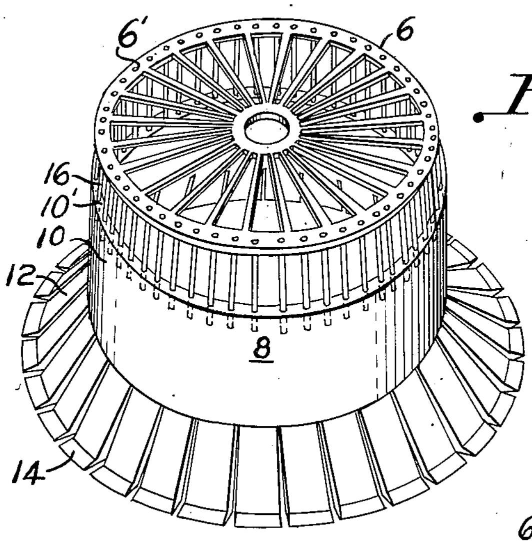
Figure 2:
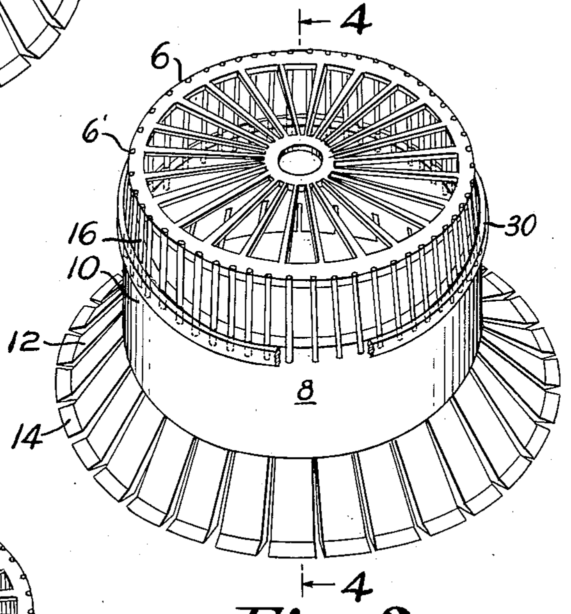
Figure 3:
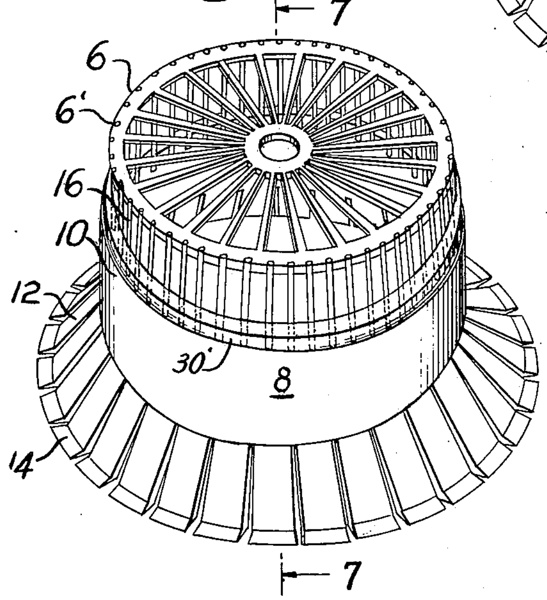
Figure 4:
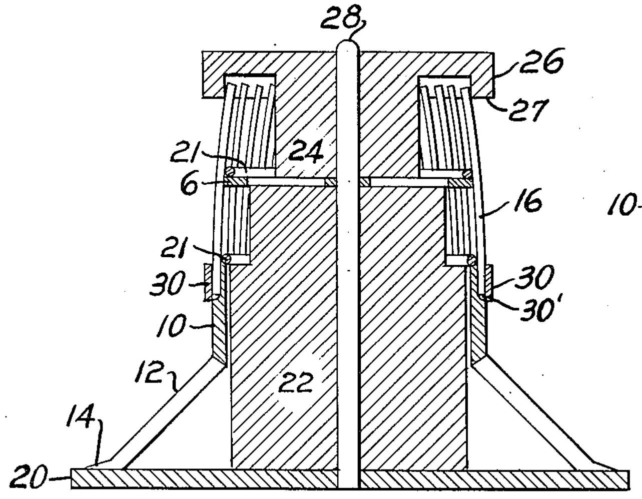
Figure 5:
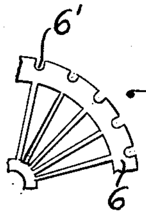
Figure 6:
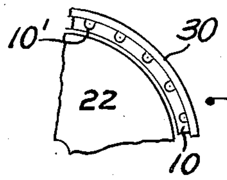
Figure 7:
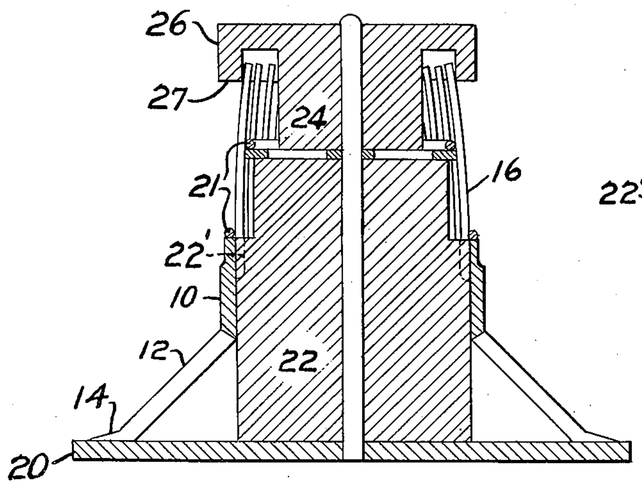
Figure 8:
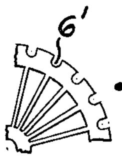
Figure 9:
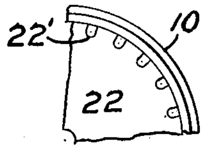

In describing my invention in detail, reference will be made to the attached drawings in which Figures 1, 2 and 3 illustrate three grid electrodes arranged in a novel manner to be fabricated in accordance with my invention. Figures 4, 5 and 6 illustrate details of the embodiment of Figure 2 and of my novel jig apparatus for assembling an electrode structure as illustrated in Figure 2 and holding the several elements in exact position while the same are being soldered and for applying the solder to all of the elements simultaneously. Figures 7, 8 and 9 illustrate details of the embodiment of Figure 3 and details of my novel jig for assembling the electrode structure and holding the several elements in the exact position desired while the same are being bonded and the method of applying the solder to the elements.

My novel grid electrodes may as illustrated in Figures 1, 2 and 3 comprise a cap member 6, a base member 8 with a cylindrical portion 10 and a conical portion 12 and a base flange 14, the conical portion 12 and flange 14 being slotted and splayed to minimize difficulties from differential thermal expansion between the grid base member and the surface of the support to which it is fastened. In practice it was found that a base member that was not slotted and splayed as described herein became distorted and warped to such an extent that the grid structure came apart and was no longer useful. The elements 16, as stated above, may be of metal of various types but are in the embodiments being described of tungsten and are disposed in parallel relation on or near the outer peripheries of the cap 6 and cylindrical portion 10 of the base 8. In Figure 1, the elements 16 are retained in openings 6′ and 10′ provided respectively in the cap member 6 and base member 10. In Figure 2, the elements 16 are to be disposed in notches 6′ and 10′ in the outer peripheries of elements 6 and 10. In Figure 3, the grid elements 16 are to be retained in notches on the outer periphery of cap member 6 and spaced along the inner periphery of the cylindrical portion 10 of the base member.

It is essential that the elements 16 be electrically and thermally substantial integral with the supports 6 and 8. This is especially necessary where the grid structure is to be used in U. H. F. amplifiers or oscillators. Moreover, it is essential that the elements 16 be strong mechanically and be good heat and electrical conductors, and that the elements 6 and 8 be good heat conductors and of the required strength. In the embodiment being described, the members 16 are tungsten rods, bars, or wires and the cap 6 and base plate 8 are copper.

Since as stated above it is not feasible to spot weld the elements 16 to the cap and base members, I propose to solder these joints. Solder having a high melting point that stands up well under high temperature and which makes a strong joint is to be used. In an embodiment of my invention, eutectic silver solder (70% silver–30% copper) was used. It was found that silver solder did not wet the tungsten members well and to improve this part of the process, the tungsten wires 16 were first nickel plated. A grid structure as disclosed in Figure 1 was built. The tungsten wires 16, of sufficient length, were inserted in the holes 6′ and 10′, in the members 6 and 10. The holes 10′ are in effect circular recesses in the end of cylinder 10, having a depth of twice the diameter of the wire grid elements. The wires 16 were passed through the openings 6′ in the outer periphery of grid cap 6 and fitted into appropriate holes 10′. The cap member 6 was spaced from the base member 8 the proper distance and held parallel thereto by a jig in the form of a base element such as at 20 and positioning and spacing elements such as at 22 and 24, all of Figure 4 or 7, with means such as a rod 28 to hold the jig elements in position. The grid base 8 may then be placed on the jig base 20 over the member 22 also on the jig base. The spacer 24 may be put in place and the pin 28 inserted. Rings of solder 21 were then positioned around the wires near the joints and the assembled elements and jig were placed in an oven in an atmosphere of hydrogen and fired to melt the silver solder which runs freely along the tungsten rods to form good joints between the rods and supports. The assembled grid is then removed from the furnace and if necessary the ends of the tungsten wires trimmed off close to the cap member 6.

In many cases it is desirable to have outward curvature of the grid elements as shown in Figure 2 in order that the wires shall not inadvertently bow inward. This feature of the structure is important because if one of the wires is bowed inward more than its neighbors, it will receive more than its proportionate share of grid current and will become hotter and bow inward still further until it eventually touches the cathode to thereby cause failure of the tube. In this embodiment to simplify the grid structure and fabricating process, the outer peripheries of the grid cap 6 and grid base cylinder 10 are slotted at 6′ and 10′ respectively to receive the grid elements 16 as shown in Figures 2a, 4, 5 and 6. To obtain this grid form and further facilitate assembly of the elements and bonding of the same, I provided additional improvements to my grid making jig as illustrated in Figures 4, 5 and 6 to hold the grid elements as desired. This jig comprises as described above a base plate 20, lower body member 22, upper body member 24, and jig cap member 26. These members are retained in the desired position by the rod or shaft 28. The jig members 20 and 22, or 20, 22 and 24 or 22 and 24 may be a single piece and may be made of any appropriate material. These members 20, 22, 24 and 26 are in the embodiment being described of stainless steel, each thereof being bored to accommodate the centering shaft 28. The base member 8 of the grid structure rests on the jig base plate 20 and the circular lower body 22 of the jig has an outer periphery at the top which fits loosely into the portion 10 of the grid structure. The outer periphery of the grid cap member 6 and of the grid base member 10 are slotted at 6′ and 10′ to receive the grid elements 16. After the members 16 are in place, a retaining ring 30 is put in place to hold the members 16 snugly within the slots in the grid support 10. The upper body member 24 of the jig holds the grid cap 6 parallel to the grid base 8 and at the desired distance therefrom. The grid elements are fitted into the slots on the outer periphery of the cap 6. The diameter of the cap 6 and the inner diameter of the axial flange 27 on the lower end of the jig cap 26 are such that this axial flange 27 bends the upper ends of the tungsten members 16 inward toward the axis of the jig to bulge these members outwardly along the portion between the grid cap 6 and grid base 8 for the purpose described above.

In practice, the jig is assembled with the grid base 8 on the jig base 20 and the jig member 22 within the grid base 8. A ring of solder 21 is placed on the upper surface of grid base member 10 and the spacer 24 is placed on the jig member 22 with the grid cap 6 on top of the spacer 24. A second solder ring 21 is placed on the cap 6 adjacent the outer periphery thereof and the jig top member 26 is placed on the grid cap 6 and centered by jig centering pin 28. The retaining ring 30 is dropped in place (before member 26 is assembled if desired) and rests on shoulder 30′ of the grid base 8. Then the tungsten wires 16 of proper length are slid up under the axial flange 27 on jig cap 26 and then drawn down and the lower end bent inwardly and slid into the slots in the grid base 8 between said base and the retaining ring 30.

After the grid and jig is assembled as described, the whole assembly is hydrogen fired to a temperature at which the silver solder melts and runs down to make the bond, on cooling. The jig is then removed from the furnace and the member 26 removed and the excess tungsten grid elements trimmed off or otherwise removed. The jig forms are disassembled and the grid is ready for use.

In the embodiment of Figures 3, 7, 8 and 9, the grid elements 16 are assembled with respect to and bonded to the grid cap 6 as illustrated in Figures 3, 4, 5 and 6. The portion 10 of the base member in this embodiment is not slotted to receive the elements 16. The outer top periphery of the stainless steel jig base member 22 is slotted as shown at 22′ in Figures 3 and 3c. The depth of the slots and diameter of the base member 22 is such that the grid elements 16 fit snugly between grid base member 10 and jig member 22. The grid and jig is assembled as described above and the wires 16 are slid up under axial flange 27 and then retracted as they are bent inwardly at the bottom ends and slid into the slots in the periphery of the base member 22. A solder ring 21 has been placed in the outer periphery of the grid cap 6 as described above and a second solder ring 21 is placed on the upper end of the cylindrical portion 10 of base member 8. Note that the need of the retaining ring 30 of the embodiment of Figures 4, 5 and 6 has been eliminated in the embodiment of Figures 3, 7, 8 and 9. The assembled apparatus is fired in an atmosphere of hydrogen, the jig member 26 removed, and the excess portions of wires 16 trimmed as described above.

I have disclosed various embodiments of my improved grid, and methods of, and a jig for fabricating the same but this is by way of example only and various modifications may be made without departing from the spirit of my inventions.

I claim:

1. In a grid structure for an electron discharge device, a circular cap member wherein substantially equally spaced openings are provided in the body thereof, an annular base member and a plurality of grid elements each fastened at one end in a different one of said openings in said cap member, each element being fastened at its other end to a different point on said base member, said last named points being substantially equally spaced in said base member.

2. In a grid structure for an electron discharge device, an annular cap member wherein are formed substantially equally spaced openings near a periphery of the cap member and in the body thereof, an annular base member wherein are formed substantially equally spaced openings near a periphery of the base member and in the body thereof and a plurality of elongated grid elements each fastened at one end in a different opening in the cap member, each element being fastened at the other end in a different opening in the base member.

3. In a grid structure for an electron discharge device, an annular cap member wherein are formed substantially equally spaced recesses along the outer periphery thereof, an annular base member having a cylindrical portion wherein are formed substantially equally spaced recesses on the outer periphery thereof, and a plurality of elongated grid elements fastened at one end in the recesses in said cap member and fastened at the other end in the recesses in said base member and a retaining ring surrounding said grid elements.

4. In a grid structure for an electron discharge device, an annular cap member wherein are formed substantially equally spaced recesses along the outer periphery thereof, an annular base member, and a plurality of elongated grid elements fastened at one end in said recesses in the outer periphery of said cap member and fastened at the other end to substantially equally spaced points along the inner periphery of said base member.

5. A grid structure for an electron discharge device, comprising a circular cap member, an annular base member, and a plurality of elongated grid elements fastened at their respective ends in the bodies of said cap member and said base member, said elements being bowed outwardly, from the axis of said members, intermediate the ends thereof and substantially parallel to each other and to said axis.

6. A grid structure comprising a base member and a plurality of grid wire elements secured thereto, said base member having a cylindrical portion to which the elements are fastened and a conical portion extending from said cylindrical portion to provide a mounting means for the grid, said grid wire elements being bowed outwardly from the axis of said base member said conical portion being slotted and splayed to prevent the same from becoming deformed in the event of undue temperature difference between the base element and structure to which it is mounted.

7. In a grid structure as in claim 1, each of said elements comprising a supporting core and a plating on the outside surface thereof, the core being of tungsten, and the plating being of nickel, said elements being fastened to said cap and base members with silver solder.

8. In a grid structure as in claim 4, each of said elements comprising a supporting core and a plating on the outside surface thereof, the core being of tungsten, and the plating being of nickel, said elements being fastened to said cap and base elements with silver solder.

9. The invention as described in claim 3 and wherein said grid elements are bonded within said openings to said cap member and base member.

10. A grid structure according to claim 3 wherein said retaining ring surrounds the ends of said grid elements recessed in said base member.

11. In a grid structure for an electron discharge device, an annular cap member having substantially equally spaced openings in the body thereof, and annular base member, and a plurality of elongated grid elements fastened at one end in said holes in said cap member and fastened at the other end to substantially equally spaced points along the inner periphery of said base member.

RUSSELL R. LAW.

REFERENCES CITED

The following references are of record in the file of this patent:

UNITED STATES PATENTS

| Number | Name | Date |
|---|---|---|
| 861,105 | Genor | July 23, 1907 |
| 2,005,257 | Eitel | June 18, 1935 |
| 2,228,939 | Zottu et al. | Jan. 14, 1941 |
| 2,264,735 | Baker et al. | Dec. 2, 1941 |
| 2,296,885 | Vance | Sept. 29, 1942 |
| 2,327,352 | Hoover | Aug. 24, 1943 |
| 2,359,769 | Litton | Oct. 10, 1944 |
| 2,380,525 | Hirmann | July 31, 1945 |
| 2,392,879 | Radcliffe | Jan. 15, 1946 |
| 2,402,119 | Beggs | June 18, 1946 |
| 2,434,962 | Rostas | Jan. 27, 1948 |